(12) United States Patent
Childs

(10) Patent No.: US 12,035,659 B2
(45) Date of Patent: Jul. 16, 2024

(54) AGRICULTURAL IMPLEMENT SYSTEM WITH A CONTROLLER FOR DETECTING AND MITIGATING PLUG CONDITIONS

(71) Applicant: CNH Industrial America LLC, New Holland, PA (US)

(72) Inventor: Albert Childs, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 479 days.

(21) Appl. No.: 17/355,805

(22) Filed: Jun. 23, 2021

(65) Prior Publication Data

US 2022/0408653 A1  Dec. 29, 2022

(51) Int. Cl.
*A01D 89/00* (2006.01)
*A01F 15/10* (2006.01)

(52) U.S. Cl.
CPC ......... *A01D 89/008* (2013.01); *A01D 89/002* (2013.01); *A01F 15/106* (2013.01)

(58) Field of Classification Search
CPC ... A01D 89/008; A01D 89/002; A01F 15/106; A01F 15/0833
See application file for complete search history.

(56) References Cited

U.S. PATENT DOCUMENTS 2,691,266 A * 10/1954 Meyer ..................... A01D 41/10
56/364
2,703,957 A * 3/1955 Russell ................... A01F 15/08
56/364
3,040,508 A * 6/1962 Nolt ....................... A01F 15/101
100/189
4,411,127 A * 10/1983 Diederich, Jr. ......... A01D 89/008
56/364
4,720,962 A * 1/1988 Klinner ................... A01D 89/008
56/DIG. 15

(Continued)

FOREIGN PATENT DOCUMENTS

CA    2650849 A1 *  1/2008  ............ A01D 84/00
DE   19918552 A1    10/2000

(Continued)

OTHER PUBLICATIONS

Extended European Search Report for EP Application No. 22179932.3 dated Nov. 18, 2022 (six pages).

*Primary Examiner* — Adam J Behrens
*Assistant Examiner* — Ashley A Kaercher
(74) *Attorney, Agent, or Firm* — Peter K. Zacharias; Rebecca L. Henkel; Rickard K. DeMille

(57) ABSTRACT

An agricultural implement system includes an agricultural implement and a controller. The agricultural implement includes: a chassis; a pickup carried by the chassis and configured to rotate and convey crop material; a movable windguard carried by the chassis; and a windguard displacement sensor associated with the windguard and configured to output windguard displacement signals corresponding to a displacement of the windguard relative to a zero position. The controller is configured to: determine a plug condition exists when the displacement of the windguard exceeds a defined displacement; and output at least one plug condition mitigation signal to adjust at least one parameter of the agricultural implement system and mitigate the plug condition responsively to determining the plug condition exists.

17 Claims, 4 Drawing Sheets

(56) References Cited

U.S. PATENT DOCUMENTS

| | | | | |
|---|---|---|---|---|
| 5,131,214 | A * | 7/1992 | Vermeer | A01F 15/0833 100/88 |
| 5,293,732 | A * | 3/1994 | Vogelgesang | A01D 89/008 56/364 |
| 6,279,304 | B1 * | 8/2001 | Anstey | A01F 15/106 56/341 |
| 6,877,304 | B1 * | 4/2005 | Smith | A01F 15/106 56/364 |
| 6,935,094 | B1 * | 8/2005 | McClure | A01D 89/008 56/190 |
| 6,948,300 | B1 * | 9/2005 | Bandstra | A01F 15/106 56/119 |
| 6,962,041 | B1 * | 11/2005 | Taylor | A01D 89/008 56/364 |
| 7,310,931 | B2 * | 12/2007 | Gramm | A01D 41/14 56/208 |
| 7,354,341 | B1 * | 4/2008 | Smith | A01D 41/127 460/4 |
| 9,038,357 | B2 * | 5/2015 | Choluj | A01D 89/008 56/364 |
| 9,198,361 | B2 * | 12/2015 | Olander | A01F 15/085 |
| 10,161,431 | B2 * | 12/2018 | Simmons | F16B 9/056 |
| 10,485,182 | B2 | 11/2019 | Devroe et al. | |
| 11,547,053 | B2 * | 1/2023 | Lammerant | A01D 89/008 |
| 2002/0108509 | A1 * | 8/2002 | Leupe | A01F 15/0825 100/189 |
| 2003/0019196 | A1 * | 1/2003 | Coers | A01D 41/127 56/10.2 G |
| 2004/0011016 | A1 * | 1/2004 | McClure | A01F 15/106 56/341 |
| 2008/0163601 | A1 * | 7/2008 | Graber | A01D 89/008 56/341 |
| 2009/0025358 | A1 * | 1/2009 | Woodford | A01D 89/008 56/364 |
| 2009/0183484 | A1 * | 7/2009 | Funk | A01D 89/004 56/208 |
| 2012/0004813 | A1 * | 1/2012 | Baumgarten | A01D 41/127 701/50 |
| 2012/0159918 | A1 * | 6/2012 | McClure | A01D 89/008 56/341 |
| 2014/0250855 | A1 | 9/2014 | Vandamme et al. | |
| 2014/0261023 | A1 * | 9/2014 | Smith | A01F 15/0833 100/45 |
| 2020/0229351 | A1 | 7/2020 | Smith et al. | |
| 2021/0267121 | A1 * | 9/2021 | Childs | G01J 3/50 |
| 2021/0274716 | A1 * | 9/2021 | Lammerant | A01D 89/008 |
| 2022/0304238 | A1 * | 9/2022 | Childs | A01D 89/002 |
| 2023/0276738 | A1 * | 9/2023 | Childs | A01D 89/008 56/341 |

FOREIGN PATENT DOCUMENTS

| | | | | |
|---|---|---|---|---|
| EP | 339733 A * | 11/1989 | | A01F 12/16 |
| EP | 1038431 A2 * | 9/2000 | | A01D 89/008 |
| EP | 1252813 A1 * | 10/2002 | | A01D 89/008 |
| EP | 1348330 A1 * | 10/2003 | | A01D 41/10 |
| EP | 1479280 A1 * | 11/2004 | | A01D 41/1276 |
| EP | 1621068 A1 * | 2/2006 | | A01D 89/008 |
| EP | 1449425 B1 * | 9/2008 | | A01D 41/1276 |
| EP | 2689653 A1 * | 1/2014 | | A01D 89/008 |
| EP | 2777379 A1 * | 9/2014 | | A01D 34/001 |
| EP | 3777514 A2 * | 2/2021 | | A01D 75/187 |
| EP | 3871489 A1 * | 9/2021 | | A01D 89/002 |
| EP | 3912456 A1 | 11/2021 | | |
| EP | 3912456 A1 * | 11/2021 | | A01D 89/002 |
| EP | 4066618 A1 * | 10/2022 | | A01D 41/06 |
| EP | 4108067 A1 * | 12/2022 | | A01D 75/18 |
| GB | 2117619 A * | 10/1983 | | A01D 89/008 |
| GB | 2395275 A * | 5/2004 | | A01F 15/0715 |
| WO | WO-2012136515 A1 * | 10/2012 | | A01D 89/002 |
| WO | WO-2013053682 A1 * | 4/2013 | | A01D 89/002 |
| WO | WO-2013090874 A1 * | 6/2013 | | A01D 43/006 |
| WO | WO-2018172210 A1 * | 9/2018 | | A01D 75/187 |

* cited by examiner

AGRICULTURAL IMPLEMENT SYSTEM WITH A CONTROLLER FOR DETECTING AND MITIGATING PLUG CONDITIONS

BACKGROUND OF THE INVENTION

The present invention pertains to agricultural implement systems, and more specifically, to a plug detection system for an agricultural implement.

Agricultural implements, such as balers, choppers, etc., may be used to pickup and handle crop material from a field. Such agricultural implements typically include a pickup, which may have a plurality of rotating tines for picking up crop material, that feeds crop material to a feeder, which feeds the crop material to one or more other elements of the implement. When the agricultural implement is a baler, the baler consolidates and packages crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw, such as wheat or oat straw, which is to be picked up by the baler. After the crop material has sufficiently dried, a baler which is typically towed by an agricultural vehicle will pick up the crop material and form it into bales.

A baler or other agricultural implement may become plugged if, for example, the pickup and/or feeder receives a sudden increase in crop volume or a large foreign object. When a plug occurs, the various subsystems of the implement may not operate correctly and/or become damaged. To reduce the risk of damage to the various subsystems, the plug should be removed. The operator may stop the tractor and remove the plugged crop material and/or foreign object upon becoming aware of the plug. It can be difficult for an operator to know when a plug is present and, further, it can be time-consuming for an operator to know how to remove a plug and/or take some or all of the steps needed to remove the plug. Once the plug is removed, operation of the implement may be resumed.

What is needed in the art is a way to reduce the detrimental effects of a plug on an agricultural implement.

SUMMARY OF THE INVENTION

Exemplary embodiments disclosed herein provide an agricultural implement system with a controller that is configured to determine a plug condition exists when a displacement of a windguard relative to a zero position exceeds a defined displacement and responsively output at least one plug signal, such as at least one plug condition mitigation signal to adjust at least one parameter of the agricultural implement.

In some exemplary embodiments provided according to the present disclosure, an agricultural implement system includes: an agricultural implement including: a chassis; a pickup carried by the chassis and configured to rotate and convey crop material; a movable windguard carried by the chassis; and a windguard displacement sensor associated with the windguard and configured to output windguard displacement signals corresponding to a displacement of the windguard relative to a zero position; and a controller operably coupled to the windguard displacement sensor. The controller is configured to: determine a plug condition exists when the displacement of the windguard exceeds a defined displacement; and output at least one plug condition mitigation signal to adjust at least one parameter of the agricultural implement system and mitigate the plug condition responsively to determining the plug condition exists.

In some exemplary embodiments provided according to the present disclosure, an agricultural implement system includes: an agricultural implement including: a chassis; a pickup carried by the chassis and configured to rotate and convey crop material; a movable windguard carried by the chassis and including a roller; a windguard displacement sensor associated with the windguard and configured to output windguard displacement signals corresponding to a displacement of the windguard relative to a zero position; and a roller speed sensor associated with the roller and configured to output roller speed signals corresponding to a rotational speed of the roller; and a controller operably coupled to the windguard displacement sensor and the roller speed sensor. The controller is configured to: determine a plug condition exists when the displacement of the windguard exceeds a defined displacement and the rotational speed of the roller is at or below a defined speed; and output at least one plug signal responsively to determining the plug condition exists.

In some exemplary embodiments provided according to the present disclosure, a method of controlling an agricultural implement including a pickup configured to convey crop material and a movable windguard is provided. The method includes: determining a plug condition exists when a displacement of the windguard relative to a zero position exceeds a defined displacement; and adjusting at least one parameter of the agricultural implement to mitigate the plug condition responsively to determining the plug condition exists.

One possible advantage that may be realized by exemplary embodiments disclosed herein is that the controller can determine when a plug condition exists based on excessive displacement of the windguard, e.g., excessive pivoting and/or linear displacement of the windguard, and cause adjustment of one or more parameters of the agricultural implement system to mitigate the plug condition, which can reduce the risk of the agricultural implement being damaged.

Another possible advantage that may be realized by exemplary embodiments disclosed herein is that the controller can determine the plug condition exists based on the displacement of the windguard and the rotation speed of the roller, which can be easily monitored and reduce the risk of having false-positive determinations that a plug condition exists.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle and/or baler are usually determined with reference to the direction of forward operative travel of the agricultural vehicle, but they should not be construed as limiting.

Figure 1:
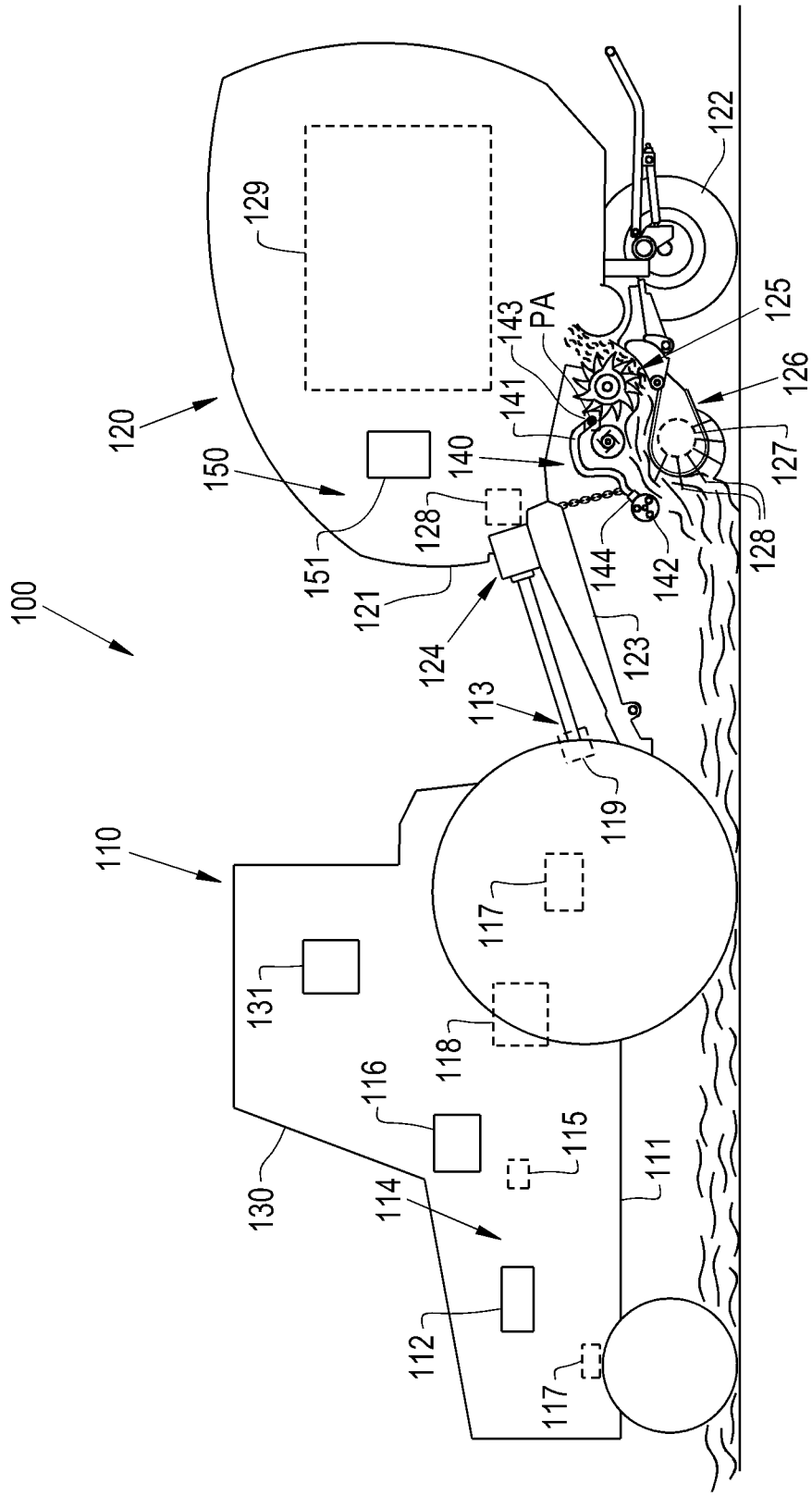
FIG. 1 illustrates a schematic view of an exemplary embodiment of an agricultural implement system, the system includes a work vehicle in the form of a tractor and an agricultural implement in the form of a baler, provided according to the present disclosure.
Figure 2:
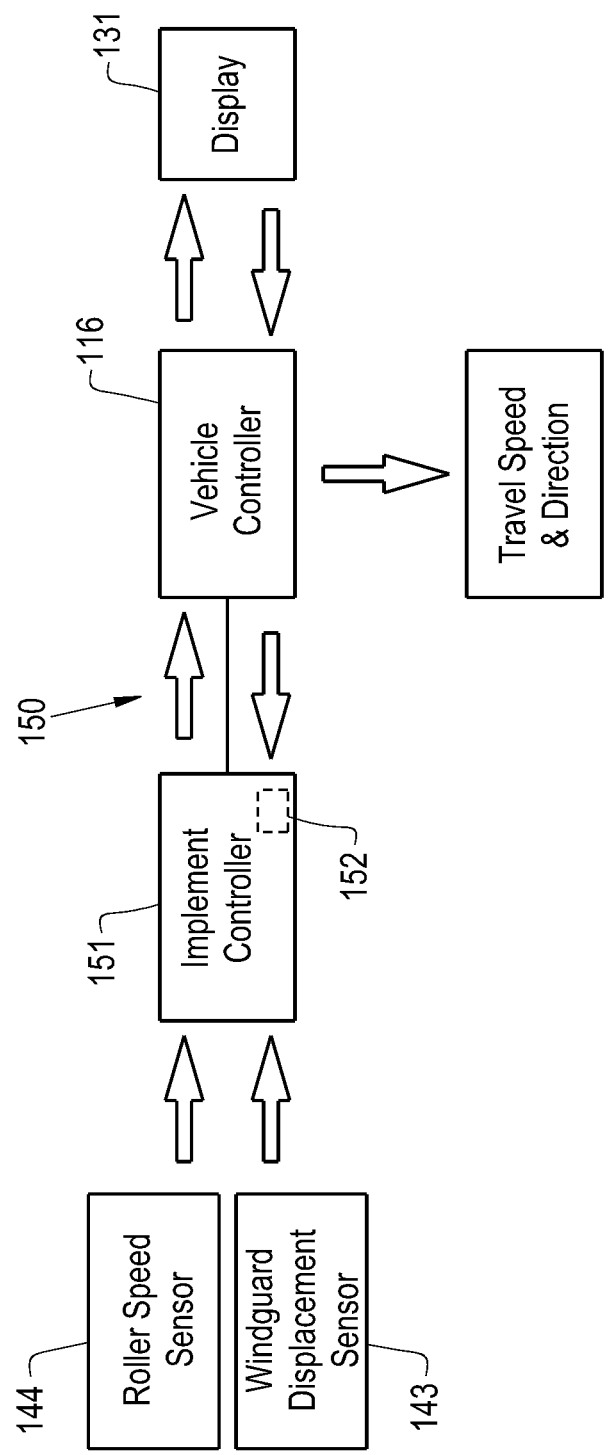
FIG. 2 illustrates a schematic view of the agricultural implement system of FIG. 1.

Referring now to the drawings, and more particularly to FIGS. 1-2, there is shown a schematic view of an agricultural implement system 100 that gathers crop material from a field. The agricultural implement system 100 generally includes a work vehicle 110, illustrated in the form of a tractor, which carries an agricultural implement 120, illustrated in the form of a baler, in a forward direction of travel. It should be appreciated that while the work vehicle 110 is illustrated and described as being in the form of a tractor, the work vehicle 110 can be other types of work vehicles that can carry the agricultural implement. Similarly, while the agricultural implement 120 is illustrated and described as being in the form of an agricultural baler, the agricultural implement 120 can be a different type of agricultural implement including, but not limited to, a forage harvester, a windrower, etc. It should be further appreciated that the agricultural implement 120, while being shown in the form of a carried vehicle, can be a self-propelled implement or vehicle, e.g., a combine harvester or a self-propelled windrower. It should thus be appreciated that the agricultural implement system 100 provided according to the present disclosure can include various types of work vehicles and/or agricultural implements.

The work vehicle 110 may be an agricultural tractor, such as an autonomous, semi-autonomous, or operator-driven tractor. The vehicle 110 may include a vehicle chassis 111, front and rear wheels and/or tracks, a prime mover in the form of an engine 112, and a power take off (PTO) coupler 113 including a PTO output shaft. The vehicle 110 may further include a drive system 114, one or more sensors 115, and a controller 116 with a memory. Since the work vehicle 110 may or may not carry an operator, the work vehicle 110 may or may not include an operator cab 130 with a display 131 disposed therein.

The drive system 114 may control the speed and direction of the work vehicle 110. The drive system 114 may include the engine 112, a drivetrain, a steering assembly, and a braking system including one or more brakes 117. The one or more sensors 115 may comprise a positioning sensor, such as a global positioning system (GPS) sensor or the like, a speed sensor, an inclinometer sensor, a moisture content sensor, etc. The controller 116 may be operably coupled to the PTO coupler 113, the drive system 114, the sensor(s) 115, and the display 131 for controlling the various operations of the work vehicle 110.

The agricultural implement 120, when in the form of a baler, produces crop material bales and deposits the bales onto the field. As shown, the implement 120 is configured as a round baler configured to generate round bales. However, in some embodiments, the implement 120 may be a different type of baler, including being configured to generate square or rectangular bales, or a different type of agricultural implement altogether. The implement 120 may generally include a chassis 121, wheels 122, a hitch or tongue 123 pivotally connected to the work vehicle 110, and a power take-off 124 coupled to a power source, which may be the engine 112. The power take-off 124 may couple to the power source (engine 112) by coupling to the PTO coupler 113 of the work vehicle 110, which is coupled to the engine 112. It should be appreciated that the power source 112 does not need to be the engine of the work vehicle 110, and may be a different source of mechanical power. The implement 120 includes a feeder 125 configured to feed crop material, e.g., further into the implement 120, and a pickup 126 including a pickup roll 127 carrying a plurality of tines 128 that are configured to convey crop material to the feeder 125 during rotation of the pickup roll 127. While the pickup 126 is described as including a pickup roll 127 carrying tines 128, in some embodiments the pickup 126 is a header-type pickup that can use one or more conveyors other than rotated tines to move crop material, e.g., a pair of augers or belts. When provided in the form of a baler, the implement 120 may also include a bale chamber 129 that is supplied with crop material by the feeder 125 and configured to form a bale from supplied crop material. The baler 120 may also include various operational parameter sensors including a positioning sensor, such as a global positioning system (GPS) sensor or the like, a speed sensor, an inclinometer sensor, a moisture content sensor, etc.

In a baling operation, the pickup 126 lifts the crop material from the field and moves the crop material rearwardly toward the feeder 125. The feeder 125 processes the crop material and moves the crop material rearwardly toward the bale chamber 129, where the crop material is rolled into a bale of a predetermined size. The bale chamber 129 may be in the form of a continuously variable bale chamber 129. Hence, the bale chamber 129 may include multiple rolls or rollers, one or more cylinders and/or pivot arms coupled to the movable rollers, at least one belt, and a bale density pressure mechanism. Together, the rollers and the belt(s) may create a round circulating chamber which expands in between an empty bale position and a full bale position for engaging and rolling the bale. When the bale reaches a predetermined size, the bale is wrapped with a wrapping material by the wrapping mechanism or wrapper. Once wrapped, a tailgate opens to allow the bale to roll out of the bale chamber 129 to be deposited onto the field or onto a bale holding device which is connected to the baler 120.

The agricultural implement 120 also includes a windguard 140 that is carried by the chassis 121 and can hold down crop material as the crop material is being conveyed rearwardly. The windguard 140 is movable, such as pivotable about a pivot axis PA. The windguard 140 may include, for example, one or more arms 141 that are pivotable about the pivot axis PA and a roller 142 that is coupled to the arm(s) 141 so pivoting of the arm(s) 141 causes a corresponding pivoting of the roller 142. It should be appreciated that while the windguard 140 is illustrated as a roller-type windguard with a roller 142, the windguard 140 may also be configured as a different type of windguard, e.g., a windguard with tines. It should be further appreciated that while the windguard 140 is illustrated and described as a pivotable windguard, the windguard 140 may be movable in other ways, e.g., linearly displaceable.

The agricultural implement system 100 includes a control system 150 which includes the previously described controller 116, which may be referred to as a "vehicle controller," carried by the vehicle chassis 111 and another controller 151, which may be referred to as an "implement controller," that is carried by the chassis 121 of the implement 120 and coupled to an implement memory 152. It should be appreciated that reference to one or more of "the controllers" 116, 151 may also generally refer to the "control system" 150, which includes the one or more controllers 116, 151, so any function described as being performed by one or both of the controllers 116, 151 can be similarly performed by a control system including the controllers 116, 151 and/or other controllers.

In known agricultural implements, a heavy inflow of crop material, which may be sudden, can result in a plug forming at elements that pick up the crop material, e.g., the pickup and the feeder. Such plugs can be difficult to predict, since crop material density may vary across a field, and also to detect before the plug causes detrimental operation of the implement. If a plug condition exists, e.g., if a heavy influx of crop material is accumulating at the pickup and/or the feeder, early determination that the plug condition exists can be used to adjust one or more parameters of the agricultural implement to mitigate the plug condition, i.e., reduce the risk of the plug of crop material detrimentally affecting implement performance and/or damaging components of the implement.

To address some of the issues with known agricultural implements, and referring now to FIGS. 3A-3D as well, the agricultural implement 120 includes a windguard displacement sensor 143 that is carried by the chassis 121, associated with the windguard 140, and configured to output windguard displacement signals corresponding to a displacement of the windguard 140 relative to a zero position. In the illustrated embodiments, the windguard displacement sensor 143 is in the form of an angle sensor that is configured to output displacement signals corresponding to a pivot angle of the windguard 140 relative to the pivot axis PA, along which vertexes of the pivot angle may lie. However, it should be appreciated that the windguard displacement sensor 143 may alternatively or additionally be configured to output displacement signals corresponding to a distance of the windguard 140 from the zero position, e.g., if the windguard 140 raises 1 m from the zero position, the output displacement signals may correspond to a displacement of 1 m. In some embodiments, the windguard displacement sensor 143 is configured as an on/off sensor that outputs (or ceases outputting) windguard displacement signals only when the displacement of the windguard 140 exceeds the defined displacement; in such embodiments, the output displacement signals still correspond to the displacement of the windguard 140 relative to the zero position as the presence or absence of the windguard displacement signals indicate whether the windguard 140 is displaced to the defined displacement or not. It should be appreciated that the "zero position" may be any defined position that can serve as a basis for determining the displacement of the windguard 140, such as the natural position that the windguard 140 assumes due to gravity. The windguard displacement sensor 143 may be, for example, associated with the one or more arms 141 of the windguard 140, which pivot about the pivot axis PA, so the windguard displacement sensor 143 outputs windguard displacement signals corresponding to the pivot angle of the arm(s) 141, which may carry the roller 142 of the windguard 140 and thus correspond to the pivot angle of the windguard 140. The windguard displacement sensor 143 may be, for example, a rotary potentiometer or a Hall-effect type sensor, which are known in the art for determining angle values and/or for detecting angle changes.

The windguard displacement sensor 143 is operably coupled to a controller, which may be the vehicle controller 116, the implement controller 151 and/or the control system 150 generally. For convenience of description, further description describes the windguard displacement sensor 143 as being operably coupled to the implement controller 151, which is carried by the chassis 121, but it should be appreciated that in some embodiments the windguard displacement sensor 143 is additionally or alternatively operably coupled to the vehicle controller 116 carried by the vehicle chassis 111, which may perform the same functions described further herein with respect to the implement controller 151. The implement controller 151 is configured to determine a plug condition exists when the displacement of the windguard 140, such as the pivot angle, exceeds a defined displacement, such as a defined pivot angle, and output at least one plug condition mitigation signal to adjust at least one parameter of the agricultural implement system 100 and mitigate the plug condition responsively to determining the plug condition exists. As used herein, to "adjust at least one parameter of the agricultural implement system 100 and mitigate the plug condition" refers to adjusting one or more operating parameters of the agricultural implement system 100 in a manner that is expected to, or actually does, reduce the risk of a plug of crop material increasing in size and/or causing damage to one or more components of the agricultural implement 120. Exemplary adjustments that can be made to mitigate the plug condition include, but are not limited to: reducing a travel speed of the agricultural implement 120 by, for example, reducing a travel speed of the work vehicle 110, e.g., stopping the work vehicle 110, which reduces the volume of incoming crop material being handled by the agricultural implement 120; changing a position of at least one knife of the agricultural implement 120, which can reduce the flow resistance of crop material going into the agricultural implement 120; changing a position of a rotor floor of the agricultural implement 120 so there is more room for crop material to flow, which reduces the risk of the plug getting stuck; and/or reducing a bale chamber density pressure, which reduces power going to the bale chamber 129 and thus increases power to the feeder 125 and the pickup 126. In other words, the implement controller 151 may be configured so the output at least one plug mitigation signal causes adjustment at least one of a travel speed of the agricultural implement 120, a position of at least one knife of the agricultural implement 120, a position of a rotor floor of the agricultural implement 120, or a density pressure of the bale chamber 129.

Figure 3A:
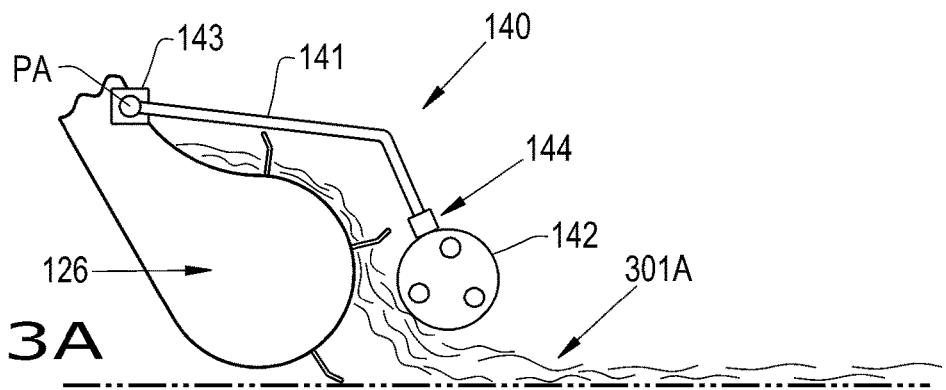
FIG. 3A illustrates a side view of an exemplary embodiment of a windguard that may be incorporated in the agricultural implement of FIGS. 1-2 when traveling across a windrow with little to no crop material.
Figure 3B:
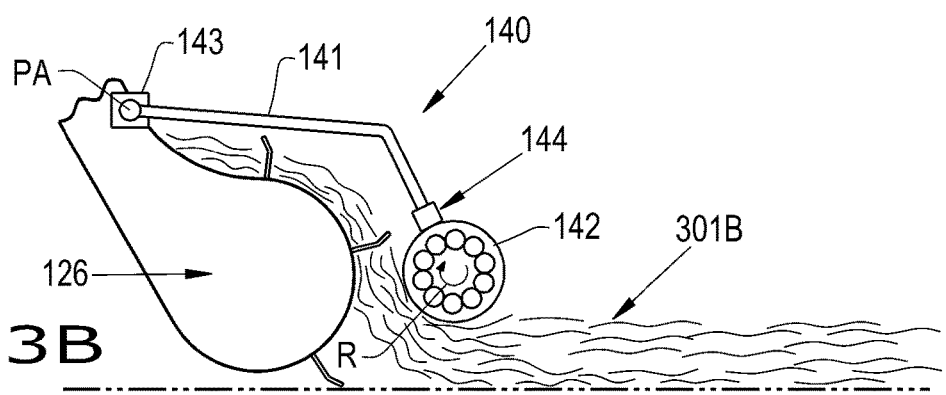
FIG. 3B illustrates a side view of the windguard of FIG. 3A when traveling across a windrow with a light amount of crop material.
Figure 3C:
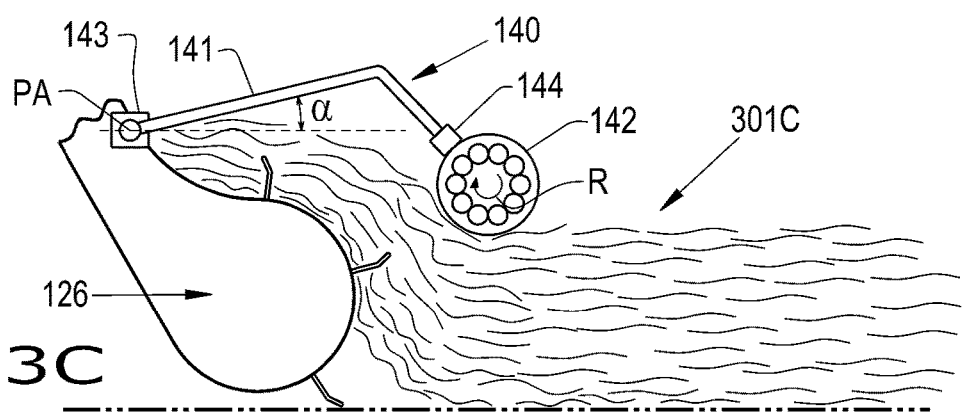
FIG. 3C illustrates a side view of the windguard of FIGS. 3A-3B when traveling across a windrow with a heavy amount of crop material.
Figure 3D:
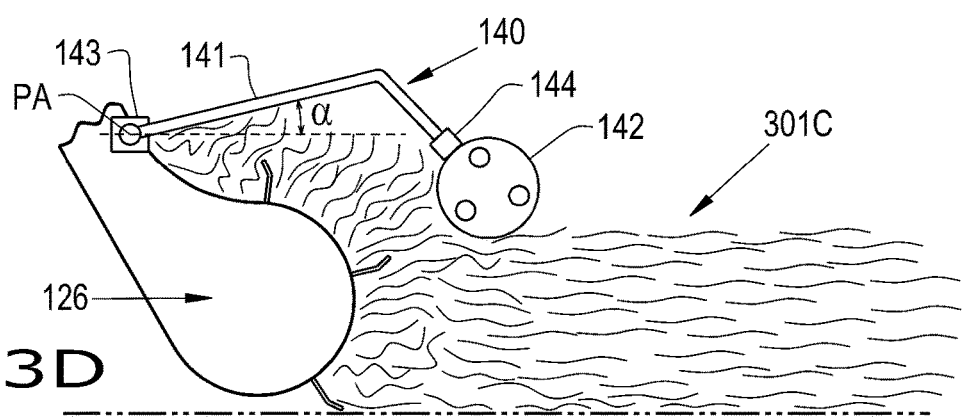
FIG. 3D illustrates a side view of the windguard of FIGS. 3A-3C when traveling across a windrow with a heavy amount of crop material such that a plug condition exists and causes rotation of a roller of the windguard to stop.

Referring specifically now to FIGS. 3A-3D, the behavior of the windguard 140 in response to various crop material flow conditions is illustrated. FIG. 3A illustrates the windguard 140 when the agricultural implement 120 is traveling across a windrow 301A with little or no crop material. As illustrated in FIG. 3A, the windguard 140 is down at a zero position where there is little crop material coming into the agricultural implement 120 and a plug condition does not exist. It should be appreciated that the zero position illustrated in FIG. 3A is exemplary only, and other zero positions can be defined for the windguard 140 according to the present disclosure. FIG. 3B illustrates when the agricultural implement 120 is traveling across a windrow 301B with a light amount of crop material. As illustrated in FIG. 3B, the windguard 140 is still at the zero position, which indicates that a plug condition does not exist. FIG. 3C illustrates when the agricultural implement 120 is traveling across a windrow 301C with a heavy amount of crop material. As illustrated in FIG. 3C, the windguard 140, i.e., the arm(s) 141 and the roller 142, has displaced, i.e., pivoted, upwardly about the pivot axis PA to a pivot angle α in response to the heavy flow of crop material pushing up on the windguard 140. The pivot angle α illustrated in FIG. 3C may correspond to the defined displacement, so further displacement/pivoting of the windguard 140 past the pivot angle α illustrated in FIG. 3C causes the implement controller 151 to determine that a plug condition exists and output the at least one plug mitigation signal. It should be appreciated that while the pivot angle α is described as being the displacement, in some embodiments the displacement corresponds to a linear displacement, e.g., a height change, of the windguard 140 from the zero position to the defined displacement. FIG. 3D illustrates when the agricultural implement 120 is traveling across the windrow 301C illustrated in FIG. 3C, but may be traveling at a higher speed, across an area with a greater volume and/or density of crop material, and/or across a large wad of crop material in the field so a greater amount of crop material is being introduced into the agricultural implement 120.

It has been found that while the displacement of the windguard 140, such as a pivot angle α, exceeding the defined displacement, such as the defined pivot angle, can be used to determine when a plug condition exists, there are certain situations when the displacement exceeding the defined displacement alone does not always correspond to a plug condition existing. For instance, agricultural implements with certain geometries and clearances may have windguards that regularly operate at their maximum displacement. In such instances, determining the plug condition exists solely based on when the displacement exceeds the defined displacement may be prone to determining that a plug condition exists when no plug condition actually exists, i.e., a false positive.

To reduce the risk of improperly determining when a plug condition exists, and referring still to FIGS. 3A-3D, in some embodiments a roller speed sensor 144 is associated with the roller 142, operably coupled to the controller, such as the implement controller 151, and is configured to output roller speed signals corresponding to a rotational speed of the roller 142. The controller, such as the implement controller 151, may be then further configured to determine a plug condition exists when the displacement of the windguard 140 exceeds the defined displacement and the rotational speed of the roller 142 is at or below a defined speed. The defined speed may be, for example, zero rotations per minute, corresponding to a state when the roller 142 is not rotating, which in combination with the displacement being greater than the defined displacement indicates that a plug condition exists. In some embodiments, the controller, such as the implement controller 151, is configured to determine a plug condition exists when the displacement of the windguard 140 exceeds the defined displacement and the rotational speed of the roller 142 decelerates at a greater rate than a defined deceleration rate, which may indicate that the roller 142 has encountered a plug of crop material and quickly decelerated due to increased resistance from the plug.

Referring specifically to FIG. 3A, it is illustrated that the windguard 140 is at the zero position and the roller 142 is not rotating due to a lack of crop material engagement. Thus, even though the rotational speed of the roller 142 may be zero rotations per minute, which is at or below the defined speed, the implement controller 151 does not determine a plug condition exists and output at least one plug mitigation signal because the displacement of the windguard 140 does not exceed the defined displacement. Thus, the implement controller 151 is not prone to false-positive determinations of plug conditions existing in the scenario illustrated in FIG. 3A.

Referring specifically to FIG. 3B, it is illustrated that the windguard 140 is at the zero position and the roller 142 is rotating, indicated by arrow R, due to crop material engagement. Thus, the rotational speed of the roller 142 is not at or below the defined speed and the displacement of the windguard 140 does not exceed the defined displacement, so the implement controller 151 does not determine a plug condition exists and output at least one plug mitigation signal because neither condition indicative of a plug condition exists.

Referring specifically to FIG. 3C, it is illustrated the windguard 140 is displaced by pivoting upwardly to a pivot angle α that exceeds the defined displacement (pivot angle) but the roller 142 is rotating, as indicated by arrow R. Thus, while the displacement (pivot angle α) of the windguard 140 exceeds the defined displacement, the rotational speed of the roller 142 is not at or below the defined speed so the implement controller 151 does not determine a plug condition exists and output at least one plug mitigation signal because rotation of the roller 142 indicates that crop material is still flowing and moving the roller 142 above the defined speed and no plug condition exists.

Referring specifically to FIG. 3D, it is illustrated that the windguard 140 is displaced by pivoting upwardly to a pivot angle α that exceeds the defined displacement and the roller 142 is not rotating. Thus, the implement controller 151 determines that a plug condition exists because the displacement (pivot angle α) exceeds the defined displacement and the rotational speed of the roller 142 is at or below the defined speed and responsively outputs at least one plug mitigation signal to cause adjustment of at least one parameter of the agricultural implement system 100. The rotational speed of the roller 142 being at or below the defined speed, in combination with the displacement of the windguard 140 exceeding the defined displacement, indicates that there is a large amount of crop material at the windguard 140 and the crop material has compacted together to a degree that the roller 142 is no longer able to rotate, i.e., that a plug has formed. Thus, the implement controller 151 being configured to determine the plug condition exists when both the displacement of the windguard 140 exceeds the defined displacement and the rotational speed of the roller 142 exceeds the defined speed allows the implement controller 151 to accurately determine when plug conditions actually exist and reduce the incidence of false-positive determinations.

Figure 4:
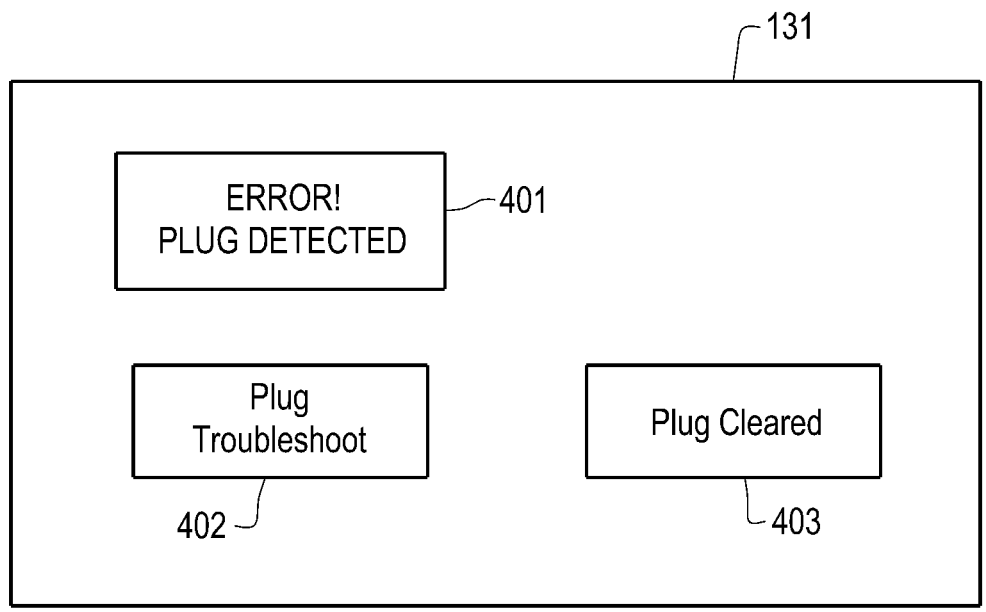
FIG. 4 illustrates an exemplary embodiment of a display that may be incorporated in the work vehicle of FIGS. 1-2 to show when a plug condition exists.

While the previous description describes a controller, such as the implement controller 151 and/or the vehicle controller 116, configured to output at least one plug mitigation signal responsively to determining a plug condition exists when the displacement of the windguard 140 exceeds the defined displacement and the rotational speed of the roller 142 is at or below the defined speed, in some embodiments the controller 151, 116 is configured to output at least one plug signal responsively to determining the plug condition exists. The at least one plug signal may, for example, be received by the display 131 to alert an operator that the plug condition exists. Referring now to FIG. 4, the display 131 is illustrated after the controller, such as the implement controller 151, outputs the at least one plug signal responsively to determining the plug condition exists. The output plug signal causes the display 131 to present a plurality of icons 401, 402, 403. One of the icons 401 may be a plug alert icon that indicates that the plug condition exists so an operator may react accordingly. Another of the icons 402 may be a plug troubleshoot icon that, when selected, can cause the display 131 to present a series of icons and/or text to guide a user through removing the plug condition. The icon 403 may be a plug cleared icon that, when selected, outputs a plug cleared signal to the implement controller 151, which may cause the implement controller 151 to adjust at least one parameter of the agricultural implement system 100. For example, if the implement controller 151 adjusted one or more parameters responsively to determining the plug condition exists, the implement controller 151 may reverse the adjustment to return the adjusted parameter(s) to the setting that was present before determining that the plug condition exists. It should thus be appreciated that the controller 116, 151 provided according to the present disclosure can output a variety of different signals responsively to determining that the plug condition exists.

From the foregoing, it should be appreciated that the agricultural implement system 100 provided according to the present disclosure has a controller 116, 151 that can determine when plug conditions exists based on the displacement of the windguard 140, alone or in combination with the rotational speed of a roller 142, and output signals responsively. The output signals may be at least one plug mitigation signal that causes adjustment of at least one parameter of the agricultural implement system 100 to mitigate the plug condition and/or at least one plug signal, which may inform an operator that the plug condition exists. It should thus be appreciated that exemplary embodiments provided according to the present invention can reduce the detrimental impact that plugs have on the components of agricultural implements and also reduce the risk of false-positive determinations that plug conditions exist.

Figure 5:
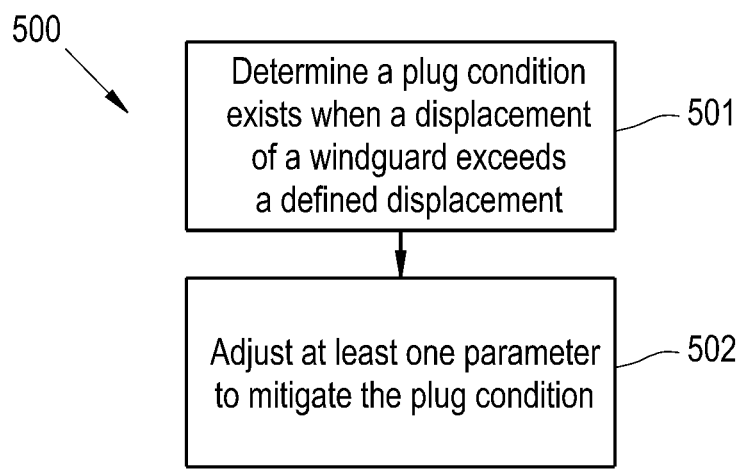
FIG. 5 illustrates a flowchart of an exemplary embodiment of a method of controlling an agricultural implement, provided in accordance with the present disclosure.

Referring now to FIG. 5, an exemplary embodiment of a method 500 of controlling an agricultural implement system 100 including an agricultural implement 120 having a movable windguard 140 provided according to the present disclosure is illustrated. The method 500 includes: determining 501 a plug condition exists when a displacement of the windguard 140 relative to a zero position exceeds a defined displacement and adjusting 502 at least one parameter of the agricultural implement system 100 to mitigate the plug condition responsively to determining 501 the plug condition exists. In some embodiments, the adjusting 502 includes adjusting at least one of a travel speed of the agricultural implement 120, a position of at least one knife of the agricultural implement 120, a position of a rotor floor of the agricultural implement 120, or a density pressure of a bale chamber 129 of the agricultural implement 120. In some embodiments, determining 501 the plug condition exists further includes determining a rotational speed of a roller 142 of the windguard 140 is at or below a defined speed, which may be zero rotations per minute, and/or determining that the roller 142 has decelerated at a greater rate than a defined deceleration rate. Adjusting 502 the at least one parameter may, for example, prevent a plug of crop material from forming and/or reduce the severity of the plug of crop material as the agricultural implement 120 handles crop material, which can prevent damage to the agricultural implement 120 and lost productivity to clear out the plug.

It is to be understood that one or more of the steps of the method 500 can be performed by the vehicle controller 116 and/or the implement controller 151 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller(s) 116, 151 described herein, such as the method 500, is implemented in software code or instructions which are tangibly stored on a tangible computer readable medium. The controller(s) 116, 151 load(s) the software code or instructions via a direct interface with the computer readable medium or via a wired and/or wireless network. Upon loading and executing such software code or instructions, the controller(s) 116, 151 may perform any of the functionality of the controller(s) 116, 151 described herein, including any steps of the method 500 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. An agricultural implement system, comprising:
 an agricultural implement, comprising:
  a chassis;
  a pickup carried by the chassis and configured to rotate and convey crop material;
  a movable windguard carried by the chassis and comprising a roller; and
  a windguard displacement sensor associated with the windguard and configured to output windguard displacement signals corresponding to a displacement of the windguard relative to a zero position;
  a roller speed sensor associated with the roller and configured to output roller speed signals corresponding to a rotational speed of the roller; and
 a controller operably coupled to the windguard displacement sensor and the roller speed sensor, the controller being configured to:

determine a plug condition exists when the displacement of the windguard exceeds a defined displacement and the rotational speed of the roller at least one of is at or below a defined speed; and output at least one plug condition mitigation signal to adjust at least one parameter of the agricultural implement system and mitigate the plug condition responsively to determining the plug condition exists.

2. The agricultural implement system of claim 1, wherein the windguard comprises at least one arm that is pivotable about a pivot axis and the windguard displacement sensor is coupled to the at least one arm.

3. The agricultural implement system of claim 2, wherein the windguard displacement sensor is an angle sensor and the defined displacement is a defined pivot angle.

4. The agricultural implement system of claim 1, wherein the controller is carried by the chassis.

5. The agricultural implement system of claim 1, wherein the defined speed is zero rotations per minute.

6. The agricultural implement system of claim 1, further comprising a work vehicle coupled to the agricultural implement, the work vehicle comprising a vehicle chassis carrying the controller.

7. The agricultural implement system of claim 1, wherein the controller is configured so the output at least one plug mitigation signal causes adjustment of at least one of a travel speed of the agricultural implement, a position of at least one knife of the agricultural implement, or a position of a rotor floor of the agricultural implement.

8. An agricultural implement system, comprising:
an agricultural implement, comprising:
a chassis;
a pickup carried by the chassis and configured to rotate and convey crop material;
a movable windguard carried by the chassis and comprising a roller;
a windguard displacement sensor associated with the windguard and configured to output windguard displacement signals corresponding to a displacement of the windguard relative to a zero position; and
a roller speed sensor associated with the roller and configured to output roller speed signals corresponding to a rotational speed of the roller; and
a controller operably coupled to the windguard displacement sensor and the roller speed sensor, the controller being configured to:
determine a plug condition exists when the displacement of the windguard exceeds a defined displacement and the rotational speed of the roller is at or below a defined speed; and
output at least one plug signal responsively to determining the plug condition exists.

9. The agricultural implement system of claim 8, further comprising a work vehicle coupled to the agricultural implement, the work vehicle comprising a vehicle chassis and a display carried by the vehicle chassis and operably coupled to the controller, the display being configured to receive the output at least one plug signal and present a plug icon indicating that the plug condition exists.

10. The agricultural implement system of claim 9, wherein the controller is carried by the vehicle chassis.

11. The agricultural implement system of claim 8, wherein the windguard comprises at least one arm that is pivotable about a pivot axis and the windguard displacement sensor is coupled to the at least one arm.

12. The agricultural implement system of claim 11, wherein the windguard displacement sensor is an angle sensor and the defined displacement is a defined pivot angle.

13. The agricultural implement system of claim 8, wherein the defined speed is zero rotations per minute.

14. The agricultural implement system of claim 8, wherein the controller is carried by the chassis.

15. A method of controlling an agricultural implement system comprising an agricultural implement comprising a pickup configured to convey crop material and a movable windguard, the method comprising:
determining a plug condition exists when (i) a displacement of the windguard relative to a zero position exceeds a defined displacement and (ii) a rotational speed of a roller of the windguard is at or below a defined speed; and
adjusting at least one parameter of the agricultural implement system to mitigate the plug condition responsively to determining the plug condition exists.

16. The method of claim 15, wherein the adjusting comprises adjusting at least one of a travel speed of the agricultural implement, a position of at least one knife of the agricultural implement, a position of a rotor floor of the agricultural implement, a density pressure of a bale chamber of the agricultural implement, a speed of a feeder of the agricultural implement, or a rotational speed of the pickup.

17. The method of claim 15, wherein the adjusting the at least one parameter at least one of prevents a plug of crop material from forming as the agricultural implement handles crop material or reduces the severity of the plug of crop material.

* * * * *